Patented Mar. 7, 1939

2,149,789

UNITED STATES PATENT OFFICE 2,149,789

HEAT TRANSFER MEDIUM

Karl Willy Rittler and Wolfgang Gündel, Radebeul, near Dresden, Germany, assignors to Chemische Fabrik von Heyden, A. G., Radebeul, near Dresden, Germany, a corporation of Germany No Drawing. Application March 20, 1936, Serial No. 69,980. In Germany March 22, 1935

4 Claims. (Cl. 252—5)

The present invention concerns a mixture for the transmission of heat, particularly a mixture of high boiling chemical compounds. These high boiling compounds are supposed to be heated in a known way, and their heat either directly be transferred through the wall of a vessel to another body, or the highly heated compounds to be transported in the usual way, e. g. by passing a pipe system, and the heat thus stored in a suitable place, then to be transmitted through the wall of a vessel to another body.

The present invention comprises the use of a material especially suitable for the transfer of heat, namely the use of arylethers of the hydroxydiaryls having the general formula

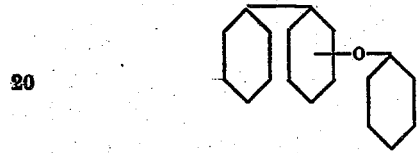

wherein

represents aryl, particularly of phenylethers of the hydroxydiphenyls, preferably the phenylethers of ortho- or para-hydroxy-diphenyl or a mixture thereof, or of the corresponding cresol- or xylenol-ethers of the hydroxydiphenyls, hydroxydicresyls etc.

It is already known, that certain high boiling substances are used for heat transmission, e. g. diphenyloxide and diphenyl. It has also been proposed already, to add other high boiling compounds, like naphthalene, aniline, diphenylmethane, chlorodiphenyl, etc., to these substances.

The mixture provided in accordance with the present invention can be heated to essentially higher temperatures than diphenyloxide or mixtures of diphenyloxide with the materials proposed heretofore. For instance, mixtures of phenylethers of ortho- and para-hydroxydiphenyl may be heated to about 340° C.

In many cases, the materials used for the transfer of heat energy should not only stand very high temperatures, but they should also remain liquid at relatively low temperatures. When using arylethers of the hydroxydiaryls, this is accomplished by adding other substances, which also stand high temperatures and have a boiling point as high as possible. Such substances are for instance acyl-diphenylethers having the general formula

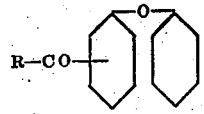

wherein R—CO— represents the residue of an organic acid, e. g., benzoic acid, like 4-benzoyl-diphenylether which has a melting point of 71° C. (Berichte der Deutschen Chemischen Gesellschaft, vol. 38, p. 2492) and a boiling point of 387–388° C. Furthermore, mono- and dibenzylnaphthalenes or mixtures thereof can be used. A mixture like that is liquid and boils above 350° C. (Beilstein, Handbuch der organischen Chemie, 4th edition, vol. 5, p. 689, 690–734). Furthermore, phenylnaphthyl-ether or dihydroxybenzol-diphenylether of the boiling point of 371–372° C. (Beilstein, Handbuch der organischen Chemie, 4th edition, vol. 6, p. 544) may for instance be added. The phenylether of the hydroxydiphenyls may also be mixed with known high boiling heat transfer mediums, like diphenyloxide or other diarylethers, as for instance dicresylethers or dinaphthylethers.

The quantities of the materials added may vary within a wide range and, in many cases, depend on how far the freezing point of the mixture is to be lowered. By adding for instance 30% of benzoyldiphenylether or 30% of a mixture of mono- and dibenzyl-naphthalene, mixtures can be obtained which still remain liquid at 10° C.

What we claim is:
1. A heat transfer medium boiling higher than 300° C., comprising arylethers of the monohydroxydiaryls, having admixed therewith benzoyldiphenylether.
2. A heat transfer medium boiling higher than 300° C., comprising arylethers of the monohydroxydiaryls, having admixed therewith benzylnaphthalenes.
3. A heat transfer medium boiling higher than 300° C., comprising arylethers of the monohydroxydiaryls, having admixed therewith phenylnaphthyl-ethers.
4. As a heat transfer medium boiling higher than 300° C., a combination of an arylether of the monohydroxydiaryls with a compound taken from the class consisting of benzoyldiphenylethers, benzylnaphthalenes, phenylnaphthylethers and dihydroxybenzoldiphenylethers.

KARL WILLY RITTLER.
WOLFGANG GÜNDEL.